United States Patent
Qin et al.

(10) Patent No.: US 12,468,955 B1
(45) Date of Patent: Nov. 11, 2025

(54) META-LEARNING STRATEGY BASED METHOD FOR EARLY WARNING OF ATTENUATION OF BEARING CAPACITY OF SOFT SOIL PILE FOUNDATION

(71) Applicant: Wenzhou University, Wenzhou (CN)

(72) Inventors: Wei Qin, Wenzhou (CN); Xin Ye, Wenzhou (CN); Yuqi Pan, Wenzhou (CN); Guoliang Dai, Wenzhou (CN); Dong Wang, Wenzhou (CN)

(*) Notice: Subject to any disclaimer, the term of this patent is extended or adjusted under 35 U.S.C. 154(b) by 0 days.

(21) Appl. No.: 19/236,772

(22) Filed: Jun. 12, 2025

(30) Foreign Application Priority Data

Dec. 13, 2024 (CN) .......................... 202411833181.6

(51) Int. Cl.
  *G06F 30/20* (2020.01)
  *G01N 3/08* (2006.01)
  *G06N 3/044* (2023.01)
  *G06N 3/0985* (2023.01)

(52) U.S. Cl.
  CPC ............. *G06N 3/0985* (2023.01); *G01N 3/08* (2013.01); *G06N 3/044* (2023.01)

(58) Field of Classification Search
  CPC ......... G06N 3/0985; G06N 3/044; G06N 3/08
  USPC ........................................................ 703/2
  See application file for complete search history.

(56) References Cited

U.S. PATENT DOCUMENTS

| | | | |
|---|---|---|---|
| 2019/0376251 A1* | 12/2019 | Tan | G01N 3/24 |
| 2021/0032833 A1* | 2/2021 | Cui | G01P 15/09 |
| 2021/0285178 A1* | 9/2021 | Xie | G06N 7/00 |
| 2024/0420419 A1* | 12/2024 | Kaiser | E21B 41/00 |

FOREIGN PATENT DOCUMENTS

| | | |
|---|---|---|
| CN | 114740089 A | 7/2022 |
| CN | 117272040 A | 12/2023 |
| CN | 118350091 A | 7/2024 |
| CN | 118569094 A | 8/2024 |
| CN | 221898982 U | 10/2024 |

(Continued)

OTHER PUBLICATIONS

Hadi Fattahi, Hossein Ghaedi, Farshad Malekmahmoodi, Danial Jahed Armaghani: "Optimizing pile bearing capacity prediction: Insights from dynamic testing and smart algorithms in geotechnical engineering",《地下空间与工程学报》, Mar. 22, 2024 (Mar. 22, 2024), pp. 1-11.

(Continued)

*Primary Examiner* — Andre Pierre Louis (57) ABSTRACT

The present disclosure relates to a meta-learning strategy based method for early warning of attenuation of a bearing capacity of a soft soil pile foundation. The method includes: S1, building a loop loading test device; S2, setting up a data set; S3, building and training a base model; S4, introducing a meta-learning strategy into the base model obtained in S3, inputting a pre-training data set for pre-training, and obtaining a pre-trained model; and S5, inputting a target data set into the pre-training data set for pre-training, and obtaining a model prediction result. The method constructs an intelligent early warning model with fast adaptability, such that the intelligent early warning model can make full use of existing engineering experience.

8 Claims, 6 Drawing Sheets

(56) References Cited

FOREIGN PATENT DOCUMENTS

CN 118966568 A 11/2024

OTHER PUBLICATIONS

Jitendra Khatti, Kamaldeep Singh Grover, Hyeong-Joo Kim, Kevin Bagas A. Mawuntu, Tae-Woong Park: "Prediction of ultimate bearing capacity of shallow foundations on cohesionless soil using hybrid LSTM and RVM approaches: An extended investigation of multicollinearity", «Computers and Geotechnics», Nov. 9, 2023 (Nov. 9, 2023), pp. 1-17.

* cited by examiner

META-LEARNING STRATEGY BASED METHOD FOR EARLY WARNING OF ATTENUATION OF BEARING CAPACITY OF SOFT SOIL PILE FOUNDATION

CROSS-REFERENCE TO RELATED APPLICATIONS

The present application claims priority to Chinese Patent Application No. 2024118331816, filed on Dec. 13, 2024, the entire disclosure of which is incorporated herein by reference.

TECHNICAL FIELD

The present disclosure relates to the technical field of foundation engineering and structural health monitoring, in particular to a meta-learning strategy based method for early warning of attenuation of a bearing capacity of a soft soil pile foundation.

BACKGROUND

In the field of geotechnical engineering, monitoring and early warning of attenuation of a bearing capacity of pile foundations has been an important research topic. At present, traditional methods such as settlement observation and stress-strain monitoring are mainly used in engineering practice to assess changes in the bearing capacity of the pile foundations. These methods can record a stress state and deformation characteristics of the pile foundations in real time, providing an important reference for engineering safety. However, such observation means essentially belong to passive monitoring, can only reflect the occurrence of the attenuation of the bearing capacity of the pile foundation, and cannot effectively predict a possible future trend of the attenuation of the bearing capacity, and it is even more difficult to implement early warning.

The finite element analysis method can simulate a pile-soil interaction mechanism and calculate evolution of stress and displacement fields by establishing a numerical model, so as to carry out a predictive study on the attenuation law of the bearing capacity of the pile foundation. However, there are obvious limitations of finite element analysis. First of all, establishing an accurate geological model and a material ontological relationship requires a large amount of field investigation and indoor test data. Second, a complex nonlinear computational process consumes sizable time and computational resources. Most importantly, due to the variability of geological conditions and engineering environments, it is difficult to directly transfer a finite element model established for a specific project to other projects for use, which seriously restricts the popularization and application of the method in engineering practice.

Consequently, the development of fast, accurate and universally applicable methods for predicting the attenuation of the bearing capacity of the pile foundations is of great significance for improving the safety and economy of pile foundation engineering. This requires the establishment of a more efficient and practical prediction and early warning system based on traditional monitoring means and numerical analysis methods in combination with new sensing technologies and intelligent algorithms.

SUMMARY

In view of the shortcomings of the background art, the technical problem to be solved by the present disclosure is to provide a meta-learning strategy based method for early warning of attenuation of a bearing capacity of a soft soil pile foundation. The method can construct an intelligent early warning model with fast adaptability, such that the intelligent early warning model can make full use of existing engineering experience. As for new engineering scenarios, only a small amount of field monitoring data are needed to quickly adjust and accurately predict an attenuation trend of a bearing capacity of a pile foundation.

The present disclosure is completed by uses the following technical solution: a meta-learning strategy based method for early warning of attenuation of a bearing capacity of a soft soil pile foundation includes:

S1, building a loop loading test device, performing a loop loading test, and obtaining a horizontal bearing capacity signal at the top of the model pile under a loop horizontal load, where a prototype pile is equivalent to a scaled model pile based on a second similarity theory in the loop loading test and then is subjected to the loop loading test;

S2, setting up a data set, where the data set includes a training data set, a target data set, and a pre-training data set for a base model;

S3, building and training the base model, and obtaining the base model by training a bidirectional echo state network;

S4, introducing a meta-learning strategy into the base model obtained in S3, inputting the pre-training data set for pre-training, and obtaining a pre-trained model; and S5, inputting the target data set into the pre-trained model for training, and obtaining a model prediction result.

Further, the building and training the base model in S3 is as follows:

S31, setting up the training data set of the base model;

S32, inputting the training data set into the bidirectional echo state network for training, and obtaining a trained base model; and S33, using an Adam optimizer to optimize parameters of the trained model, and obtaining an optimized base model.

Further, in S4, the meta-learning strategy is a Reptile meta-learning algorithm, inner loop training and outer loop training are performed in Reptile meta learning, the pre-trained model is optimized, and parameters of the pre-trained model are updated.

Further, the pre-training data set is used for pre-training in S4 as follows:

S41, performing copying to obtain two identical models $\phi$ and $\phi'$;

S42, randomly sampling one pre-training set in S2, making the model $\phi'$ reconstruct a sequence by using the bidirectional echo state network for the pre-training set, and completing one time of inner loop training of meta learning;

S43, updating parameters of the model $\phi$ according to a formula $\phi = \phi + \beta*(\phi' - \phi)$ on the basis of a training result of $\phi'$, and completing one outer loop of the meta learning, where $\beta$ is a meta-learning rate; and S44, repeating S42 and S43, sequentially selecting one pre-training set for pre-training, and completing pre-training of the model after set inner loops and outer loops are completed.

Further, in S31, the training data set of the base model is set up as follows: resampling loading displacement and the horizontal bearing capacity signal into time series data with a sampling frequency of 10 Hz, recording 8000 periods of loading signals in total, selecting the first 2000 periods as the training data set of the base model, and adding the signals into a sliding window for data division preprocessing.

Further, in S32, the bidirectional echo state network includes an echo state pool recursively in time series and a fully-connected reading layer, the training data set in S31 is added to the echo state pool and is trained, an input signal is projected into a sparsely connected high-dimensional space, a recursive relationship of the space is established on a timeline, the high-dimensional echo state pool is reduced to a target output signal in dimension through the fully-connected reading layer, and the trained base model is obtained.

Further, the data sets in S3 are obtained as follows: performing a plurality of tests under different working conditions through the loop loading tests in S1, obtaining time series data of attenuation of the horizontal bearing capacities of the pile foundation under the different working conditions, and manufacturing the data into a plurality of data sets, where any one data set is the target data set, and the remaining data sets are the pre-training data sets.

Further, the data sets are obtained in S3 as follows: performing a plurality of tests under different working conditions through the loop loading tests in S1, obtaining time series data of attenuation of the horizontal bearing capacities of the pile foundation under the different working conditions, and manufacturing the data into a plurality of pre-training data sets, where monitoring data under actual working conditions are the target data set.

Further, the loop loading test device includes a model box, a model pile, a loading system and a monitoring system, the loading system includes a horizontal loop loading system, an acquisition instrument and a first computer, the first computer is configured to set a loading frequency and loop times, control a loading mode and record changes of load and displacement data of a loading position of a pile body, the monitoring system includes a laser displacement sensor, a dynamic demodulation instrument and a second computer, and the second computer is connected to the dynamic demodulation instrument, so as to record a change of a wavelength of the pile body.

Further, a target pile foundation monitoring system is established under an actual working condition, monitoring data are obtained by the monitoring system, and a target data set of a horizontal bearing capacity of a pile foundation under the actual working condition is obtained.

According to the present disclosure, the lag problem existing in the traditional early warning means is solved, moreover, a complicated modeling process and calculation resource consumption in finite element analysis are avoided, and an intelligent early warning model with fast adaptability is constructed. Through the meta-learning strategy, the model can extract common characteristics and laws under different working conditions from historical engineering cases or laboratories, and establish a deep understanding of an attenuation mechanism of a bearing capacity of piles. As for new engineering scenarios, only a small amount of field monitoring data are needed to quickly adjust and accurately predict an attenuation trend of a bearing capacity of a pile foundation. Rapid migration and accurate warning are implemented. More efficient and practical decision support tools are provided for engineering practice.

DETAILED DESCRIPTIONS OF THE EMBODIMENTS

In order to further explain technical means and effects used by the present disclosure to achieve the predetermined objects of the present disclosure, the specific embodiments, structures, features and effects according to the present disclosure are described in detail below in conjunction with the accompanying drawings and preferred examples.

Figure 1:
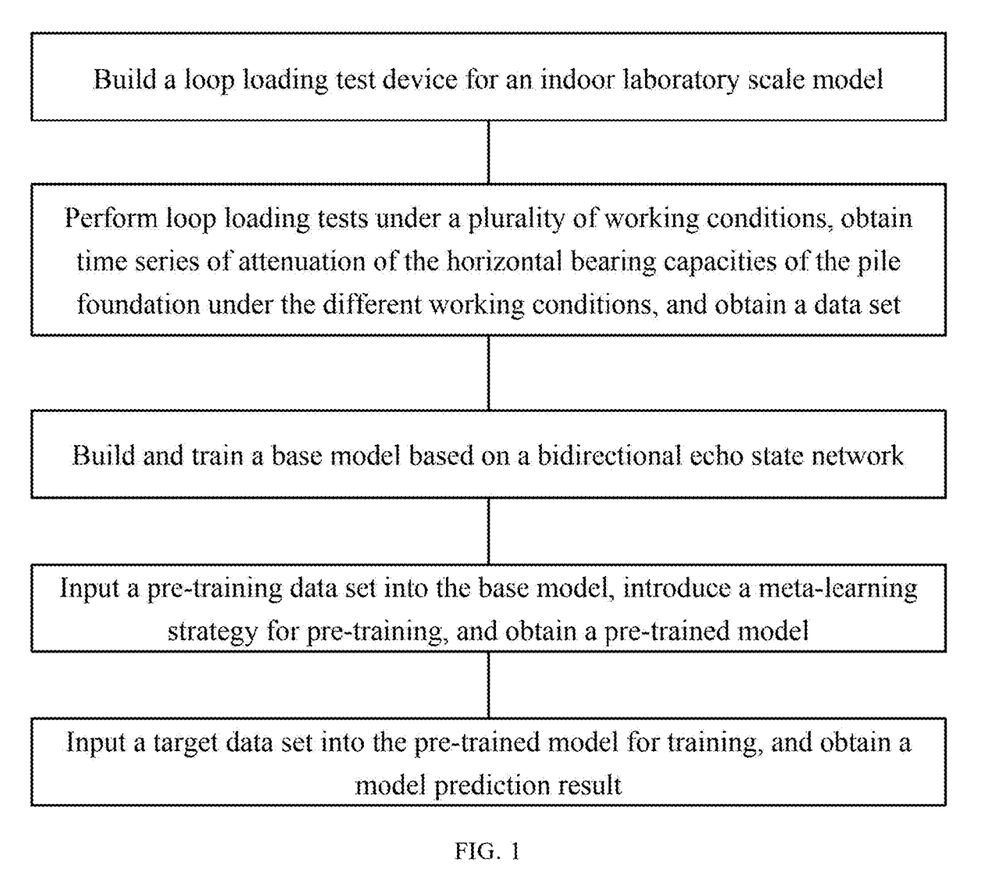
FIG. 1 is a general flowchart of a meta-learning strategy based method for early warning of attenuation of a bearing capacity of a soft soil pile foundation.

With reference to FIGS. 1-7, the present disclosure provides a meta-learning strategy based method for early warning of attenuation of a bearing capacity of a soft soil pile foundation. The method includes:

S1, a loop loading test device is built, a loop loading test is performed, and a horizontal bearing capacity signal at the top of the model pile under a loop horizontal load is obtained. A prototype pile is equivalent to a scaled model pile based on a second similarity theory in the loop loading test and then is subjected to the loop loading test.

S2, a data set is set up, where the data set includes a training data set, a target data set, and a pre-training data set for a base model.

Specifically, the target data set and the pre-training data set are obtained through two methods. The first method includes: a plurality of tests under different working conditions are performed through the loop loading tests in S1, a monitoring data signal is obtained, the signal is added into a sliding window for data division preprocessing, time series data of attenuation of the horizontal bearing capacities of the pile foundation under the different working conditions are obtained, and the data are manufactured into a plurality of data sets, where any one data set is the target data set, and the remaining data sets are the pre-training data sets. The second method includes: a plurality of tests under different working conditions are performed through the loop loading tests in S1, a monitoring data signal is obtained, the signal is added into a sliding window for data division preprocessing, time series data of attenuation of the horizontal bearing capacities of the pile foundation under the different working conditions are obtained, and the data are manufactured into a plurality of pre-training data sets, where the monitoring data under actual working conditions are the target data set.

S3, the base model is built and trained, and a time series signal of a horizontal bearing capacity of a single pile is reconstructed by training the bidirectional echo state network through the training data set of the base model, and the base model is obtained. Hysteresis characteristics of the attenuation of the bearing capacity of the pile foundation can be predicted better by bidirectional feature extraction.

Figure 2:
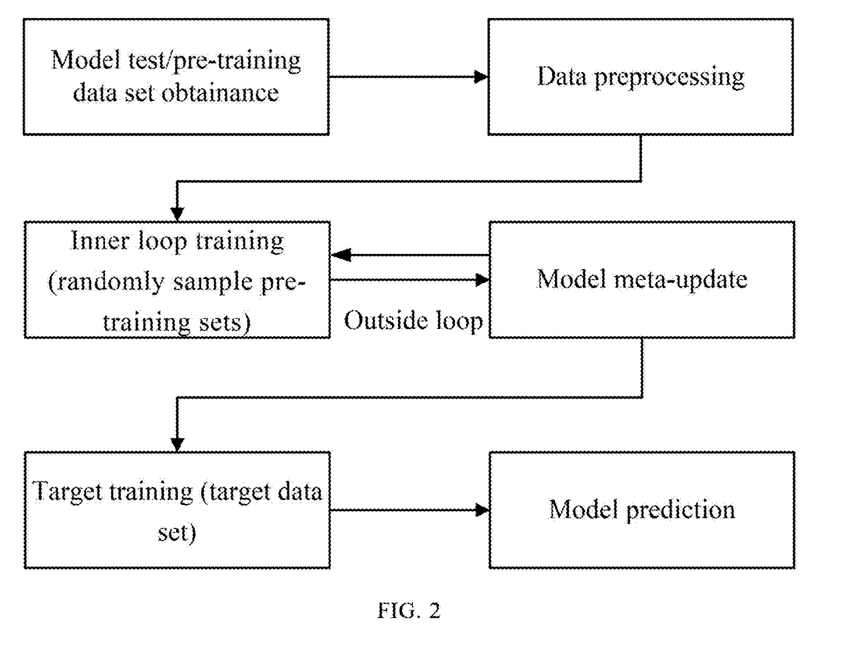
FIG. 2 is a schematic flowchart of a meta-learning method of a meta-learning strategy based method for early warning of attenuation of a bearing capacity of a soft soil pile foundation.

S4, a meta-learning strategy is introduced into the base model obtained in S3, the pre-training data set is input for pre-training, and a pre-trained model is obtained. The meta-learning strategy is a Reptile meta-learning algorithm, inner loop training and outer loop training are performed in Reptile meta learning, the pre-trained model is optimized, and parameters of the pre-trained model are updated. Introducing the Reptile meta-learning method may allow the model to learn prior knowledge from related tasks, obtain a strong generalization ability, and handle prediction tasks under different working conditions.

S5, the target data set is input into the pre-trained model for training, and a model prediction result is obtained. The target data set preferably consists of the monitoring data under the actual working conditions. Specifically, a target pile foundation monitoring system is established under an actual working condition, monitoring data are obtained by the monitoring system, and a target data set of a horizontal bearing capacity of a pile foundation under the actual working condition is obtained.

The base model is pretrained based on a plurality of pre-training data sets through the meta-learning strategy, and the parameters of pre-trained model are updated. The model can extract common characteristics and laws from historical engineering cases or laboratories, accumulate relevant experience on the pre-training set, and establish a deep understanding of an attenuation mechanism of a bearing capacity of pile foundations. Accordingly, under new engineering conditions, rapid migration and accurate warning are implemented. More efficient and practical decision support tools are provided for engineering practice. Aiming at a research status and practical engineering requirements of early warning of attenuation of the bearing capacity of the soft soil pile foundation, the method makes full use of existing engineering experience or test data to construct an intelligent early warning model with rapid adaptability. As for new engineering scenarios, only a small amount of field monitoring data are needed to quickly adjust and accurately predict an attenuation trend of a bearing capacity of a pile foundation. The lag problem existing in the traditional early warning means is solved, moreover, a complicated modeling process and calculation resource consumption in finite element analysis are avoided.

Specifically, according to the meta-learning strategy based method for early warning of attenuation of a bearing capacity of a soft soil pile foundation, the base model is built and trained in S3 as follows:

S31, the training data set of the base model is set up.

The training data set of the base model is set up as follows: loading displacement and the horizontal bearing capacity signal are resampled into time series data with a sampling frequency of 10 Hz, 8000 periods of loading signals are recorded in total, the first 2000 periods are selected as the training data set of the base model, and the signals are added into a sliding window for data division preprocessing.

S32, the training data set of the base model in S31 is input into the bidirectional echo state network for training, the horizontal bearing capacity time series signal of the single pile is reconstructed, and the trained base model is obtained.

Figure 5:
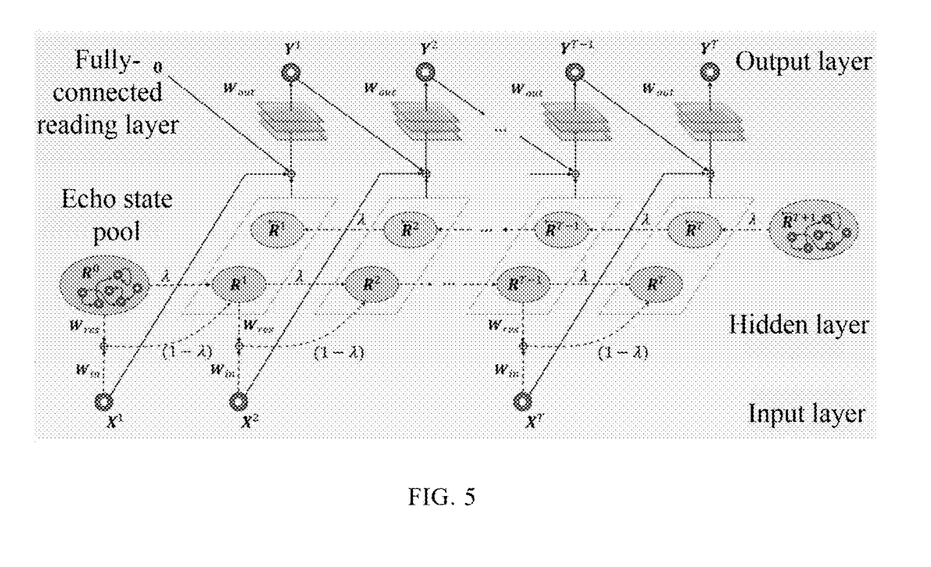
FIG. 5 is a schematic structural diagram of a bidirectional echo state network in S3 of a meta-learning strategy based method for early warning of attenuation of a bearing capacity of a soft soil pile foundation.

Specifically, as shown in FIG. 5, the bidirectional echo state network includes an echo state pool recursively in time series and a fully-connected reading layer (a lower layer of FIG. 5 is the echo state pool, and an upper layer is the fully-connected reading layer). The training data set in S31 is added to the echo state pool and is trained, an input signal is projected into a sparsely connected high-dimensional space, and a recursive relationship of the space is established on a timeline. The high-dimensional echo state pool is reduced to a target output signal in dimension through the fully-connected reading layer. The echo state pool is fixed after initialization. The fully-connected reading layer optimizes its high-dimensional feature extraction ability. The trained base model is obtained. The echo state pool is derived as follows:

$$R^{t+1} = \lambda \cdot R^t + (1-\lambda)\Psi_a(W_{in} \cdot X^t + W_{res} \cdot R^t + b_R), \quad (1)$$

Where $R^t$ is the echo state pool at time point t, $\lambda$ represents a leakage parameter during recursive derivation, and $\Psi_a$ represents an activation function that introduces a nonlinear analytical capability to the model. $X^t$ and $b_R$ are an input signal and bias of the echo pool respectively. In the bidirectional echo state network, besides forward recursive derivation, a reverse recursive mode is introduced. This method uses input signals of future time points to assist derivation of current time points. Reverse recursion is derived as follows:

$$\overleftarrow{R}^t = \lambda \cdot \overleftarrow{R}^{t+1} + (1-\lambda)\Psi_a(W_{in} \cdot X^{t+1} + W_{res} \cdot \overleftarrow{R}^{t+1} + b_R), \quad (2)$$

S33, an Adam optimizer is used to optimize parameters of the trained model, and an optimized base model is obtained.

Figure 6:
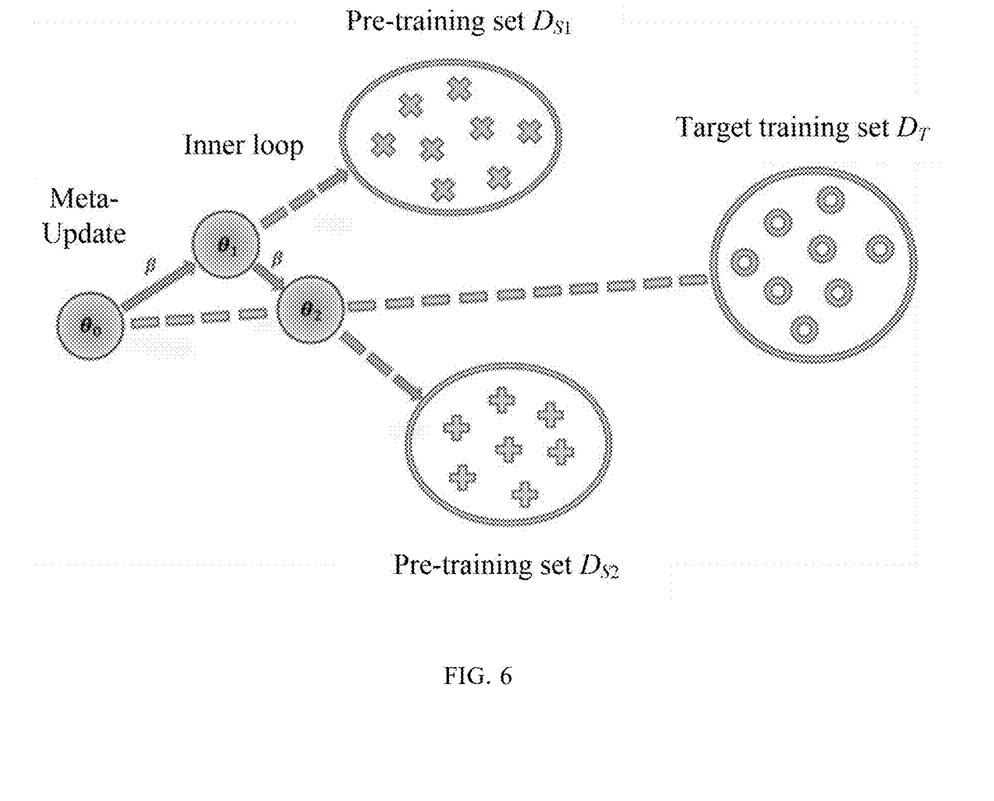
FIG. 6 is a schematic diagram of a Reptile meta-learning strategy in S4 of a meta-learning strategy based method for early warning of attenuation of a bearing capacity of a soft soil pile foundation.

With reference to FIG. 6, according to the meta-learning strategy based method for early warning of attenuation of a bearing capacity of a soft soil pile foundation, inner loop and outer loop pre-training are performed by using the pre-training data set in S4 as follows:

S41, copying is performed to obtain two identical models $\phi$ and $\phi'$.

S42, one pre-training set in S3 is randomly sampled, and the model $\phi'$ performs inner loop training once on the pre-training set to optimize the pre-training set.

S43, according to a training result of $\phi'$, parameters of the model $\phi$ are updated according to the formula $\phi=\phi+\beta*(\phi'-\phi)$ (where $\beta$ is a meta-learning rate), one outer loop is completed, the parameters of the model are updated based on the pre-training set, and relevant experience is accumulated.

S44, S42 and S43 are repeated, one pre-training set is sequentially selected for pre-training, and pre-training of the model is completed after set inner loops and outer loops are completed. As follows:

The parameter $\phi$ of the model is initialized.
For iteration i=1, 2, . . . , an outer loop is performed:
A source task $\pi_i$ is randomly selected
The current parameter $\phi$ is copied to $\phi'$
For iteration k=1, 2, . . . on the task $\pi_i$, a step inline loop is performed:
    A training loss $\mathcal{L}_{\pi,tr}(\phi)$ is calculated
    A gradient $\nabla \mathcal{L}_{\pi,tr}$ is calculated
    The parameter of the model is updated as $\phi'=\phi'-\alpha*\nabla \mathcal{L}_{\pi,tr}$ (inner loop learning rate $\alpha$)

Figure 7:
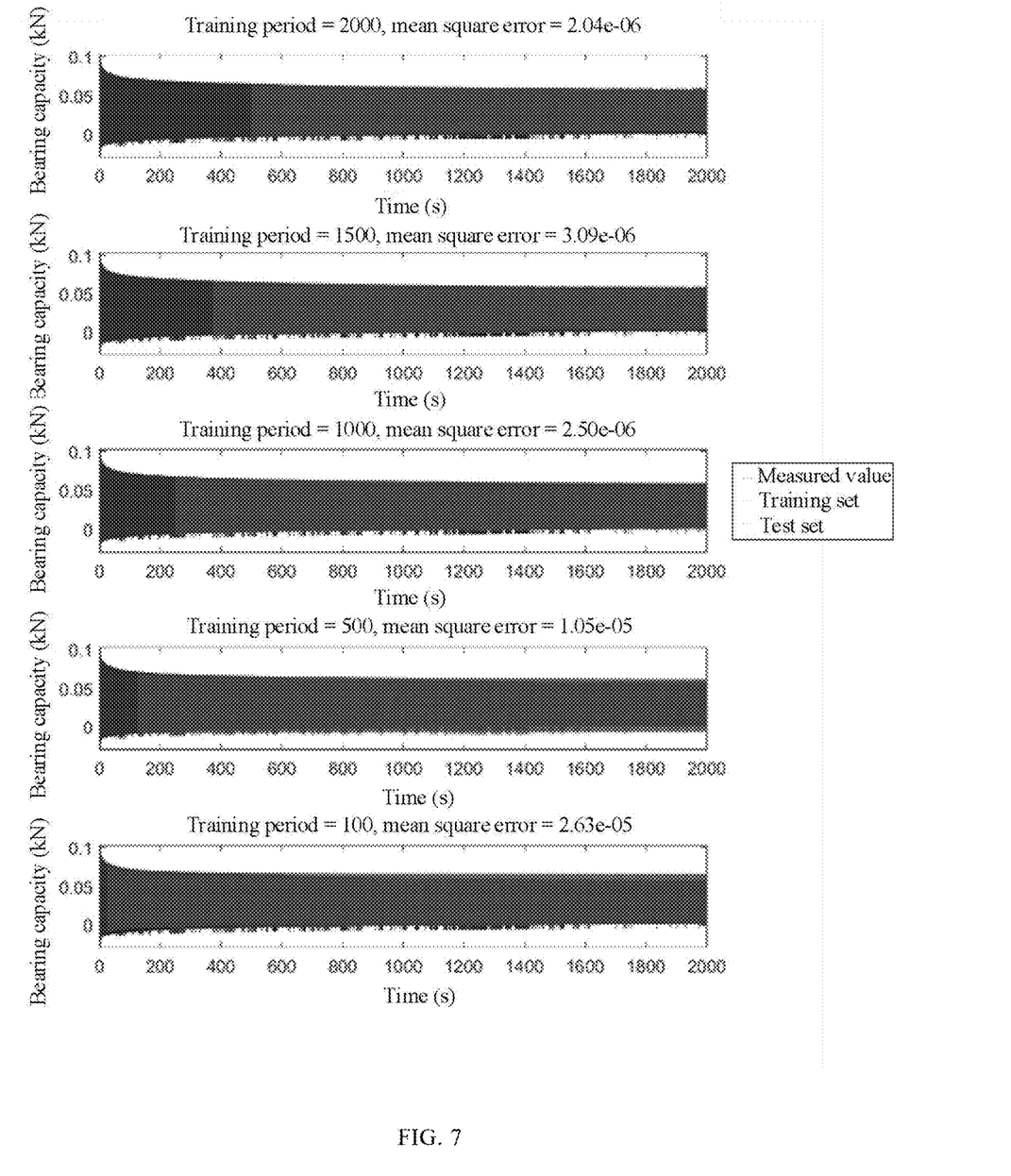
FIG. 7 is a schematic diagram showing comparison of an effect of signal reconstruction with few samples by using a meta-learning method in a meta-learning strategy based method for early warning of attenuation of a bearing capacity of a soft soil pile foundation.
Figure 8:
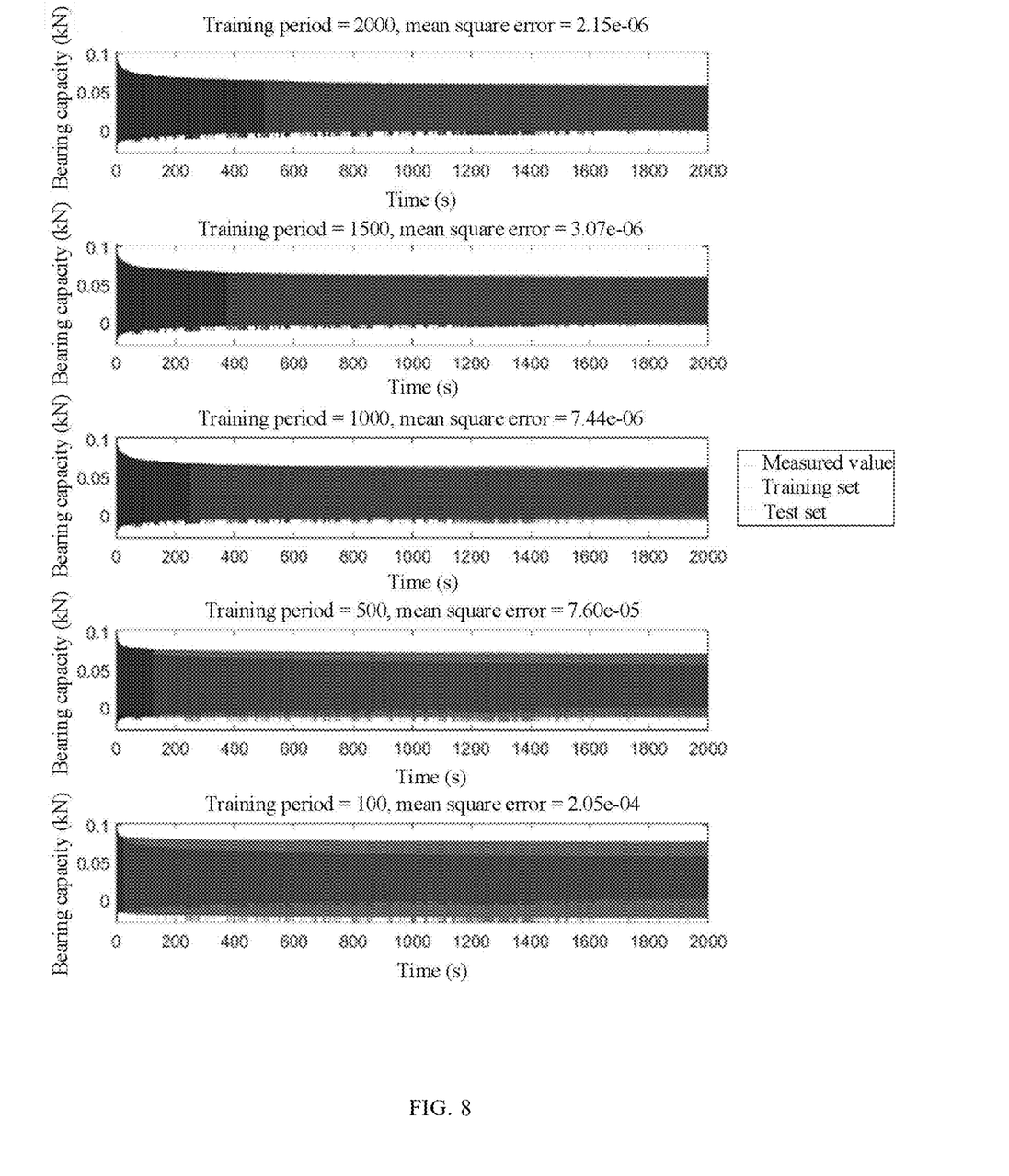
FIG. 8 is a schematic diagram showing comparison of an effect of signal reconstruction with few samples by using no meta-learning method in a meta-learning strategy based method for early warning of attenuation of a bearing capacity of a soft soil pile foundation.

The inner loop is ended
Meta-Update is executed:
$\phi=\phi+\beta*(\phi'-\phi)$ (meta-learning rate $\beta$)
The outer loop is ended With reference to FIGS. 7-8, FIG. 7 shows an effect of signal reconstruction with few samples by using a meta-learning method, and FIG. 8 shows an effect of signal reconstruction with few samples by using no meta-learning method. It can be seen that after the meta-learning method is introduced, only a short loop test is needed for a single pile, and the attenuation of the horizontal bearing capacity of the single pile can be predicted accurately.

Figure 3:
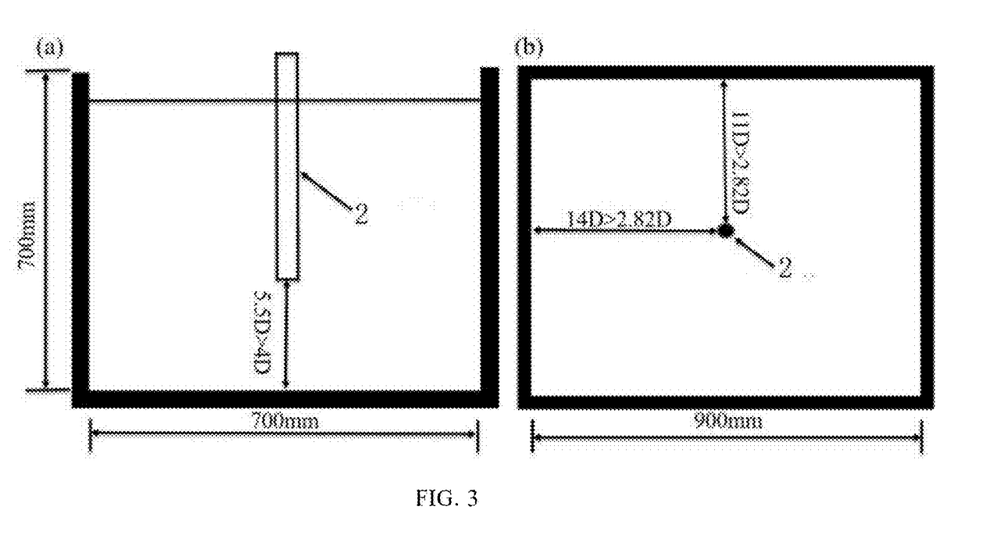
FIG. 3 is a schematic diagram of boundary effect determination of loop loading test in a meta-learning strategy based method for early warning of attenuation of a bearing capacity of a soft soil pile foundation.
Figure 4:
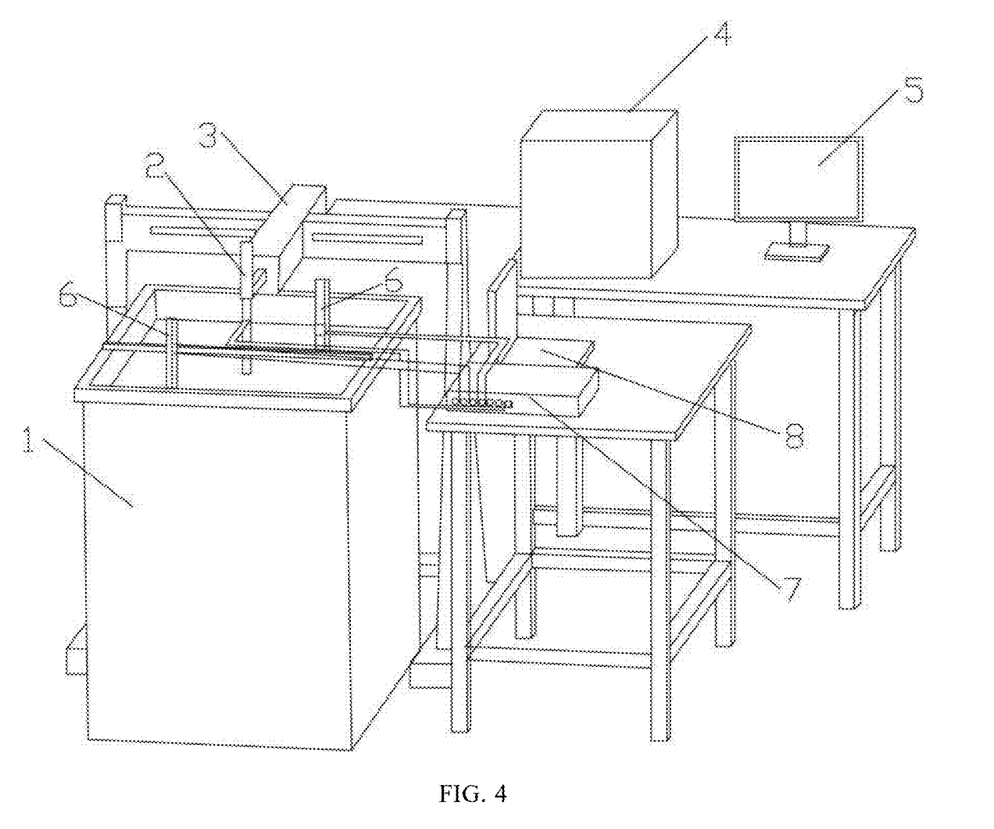
FIG. 4 is a schematic structural diagram of a loop loading test device in a meta-learning strategy based method for early warning of attenuation of a bearing capacity of a soft soil pile foundation.

Specifically, as shown in FIGS. 3-4, in S1 of the above meta-learning strategy based method for early warning of attenuation of a bearing capacity of a soft soil pile foundation, the loop loading test device includes a model box 1, a model pile 2, a loading system and a monitoring system. The loading system includes a horizontal loop loading system 3, an acquisition instrument 4 and a first computer 5. The horizontal loop loading system 3 is connected to the model pile 2. The horizontal loop loading system is connected to the first computer 5 through wires. The first computer 5 sets a loading frequency and loop times and controls a loading mode of the horizontal loop loading system. The horizontal loop loading system 3 performs loading on the model pile according to an instruction of the first computer. The first computer 5 records changes of load and displacement data of a loading position of a pile body. The monitoring system includes a laser displacement sensor 6, a dynamic demodulation instrument 7 and a second computer 8. The second computer 8 is connected to the dynamic demodulation instrument 7. The laser displacement sensor 6 is connected to the dynamic demodulation instrument 7. The laser displacement sensor 6 records a change of a wavelength of the pile body. The second computer obtains monitoring data of the laser displacement sensor 6 through the dynamic demodulation instrument 7.

Specifically, first, as for the model pile, a prototype pile is equivalent to a scaled model pile based on a second similarity theory in the loop loading test. In order to make the model pile and the prototype pile have similarity in geometry and deformation, similarity processing is carried out according to the second similarity theory. Geometric similarity processing is performed by using the following formula:

$$C_l=L_p/L_m=20:1 \tag{3}$$

where L is a pile length (m), subscripts p and m represent geometric similarity constants of the prototype pile and the model pile respectively. Moreover, a pile partial similarity conversion relationship is shown in Table 1. Basic parameters of the model pile are obtained by similar conversion to parameters of the prototype pile (with a pile as an instance).

TABLE 1 model transformation relationship

| Parameter | Transformation method | Prototype pile parameter | Model pile parameter |
|---|---|---|---|
| Pile diameter, D | $C_1 = D_p/D_m$ | 640 mm | 32 mm |
| Pile length, L | $C_1 = L_p/L_m$ | 20 m | 1 m |
| Loading frequency, f | $C_1^{-0.5} = f_p/f_m$ | 0-1 Hz | 0-4.47 Hz |

Second, after model pile design is completed, the loop loading test is carried out on the model pile. With reference to FIG. 4, an effective volume of the model box used in the test is 900 mm*700 mm*700 mm (length*width*height). When a distance between an embedded position of the model pile and an inner wall of the model box is greater than 2.82 times pile diameter, and a distance between a pile tip and a bottom of the model box is greater than 4 times pile diameter, an influence of a boundary effect on test results is omitted. The loop loading test is a loop loading test under different working conditions by means of the loading system, the horizontal bearing capacity signal of the model pile under a loop horizontal load is monitored by the monitoring system, and the monitoring data are obtained by a computer as the basis of the data sets.

The foregoing descriptions are merely some examples of the present disclosure, and are not intended to limit the present disclosure in any form. Although the present disclosure has been disclosed as above by means of the preferred examples, these examples are not for limiting the present disclosure. Those skilled in the art can make certain alterations or modifications by using the technical contents disclosed above without departing from the scope of the technical solutions of the present disclosure, so as to arrive at equivalent examples. Any brief modifications, equivalent changes and modifications not deviated from the contents of the technical solution of the present disclosure and made to the above examples according to the technical essence of the present disclosure still fall within the scope of the technical solution of the present disclosure.

What is claimed is:

1. A meta-learning strategy based method for early warning of attenuation of a bearing capacity of a soft soil pile foundation, comprising:
   S1, building a loop loading test device,
   performing a loop loading test, and obtaining a horizontal bearing capacity signal at the top of the model pile under a loop horizontal load, wherein a prototype pile is equivalent to a scaled model pile based on a second similarity theory in the loop loading test and then is subjected to the loop loading test;
   S2, setting up a data set, wherein the data set comprises a training data set, a target data set, and a pre-training data set for a base model;
   S3, building and training the base model, and obtaining the base model by training a bidirectional echo state network;
   S4, introducing a meta-learning strategy into the base model obtained in S3, inputting the pre-training data set for pre-training, and obtaining a pre-trained model, wherein the meta-learning strategy is a Reptile meta-learning algorithm, inner loop training and outer loop training are performed in Reptile meta learning, the pre-trained model is optimized, and parameters of the pre-trained model are updated; and
   the pre-training data set is used for pre-training as follows:
   S41, performing copying to obtain two identical models $\phi$ and $\phi'$;
   S42, randomly sampling one pre-training set in S2, making the model $\phi'$ reconstruct a sequence by using the bidirectional echo state network for the pre-training set, and completing one time of inner loop training of meta learning;
   S43, updating parameters of the model $\phi$ according to a formula $\phi=\phi+\beta*(\phi'-\phi)$ on the basis of a training result of $\phi'$, and completing one outer loop of the meta learning, wherein $\beta$ is a meta-learning rate; and S44, repeating S42 and S43, sequentially selecting one pre-training set for pre-training, and completing pre-training of the model after set inner loops and outer loops are completed; and S5, inputting the target data set into the pre-trained model for training, and obtaining a model prediction result.

2. The meta-learning strategy based method for early warning of attenuation of a bearing capacity of a soft soil pile foundation according to claim 1, wherein the building and training the base model in S3 is as follows:

S31, setting up the training data set of the base model;

S32, inputting the training data set into the bidirectional echo state network for training, and obtaining a trained base model; and S33, using an Adam optimizer to optimize parameters of the trained model, and obtaining an optimized base model.

3. The meta-learning strategy based method for early warning of attenuation of a bearing capacity of a soft soil pile foundation according to claim 2, wherein in S31, the training data set of the base model is set up as follows: resampling loading displacement and the horizontal bearing capacity signal into time series data with a sampling frequency of 10 Hz, recording 8000 periods of loading signals in total, selecting the first 2000 periods as the training data set of the base model, and adding the signals into a sliding window for data division preprocessing.

4. The meta-learning strategy based method for early warning of attenuation of a bearing capacity of a soft soil pile foundation according to claim 2, wherein in S32, the bidirectional echo state network comprises an echo state pool recursively in time series and a fully-connected reading layer, the training data set in S31 is added to the echo state pool and is trained, an input signal is projected into a sparsely connected high-dimensional space, a recursive relationship of the space is established on a timeline, the high-dimensional echo state pool is reduced to a target output signal in dimension through the fully-connected reading layer, and the trained base model is obtained.

5. The meta-learning strategy based method for early warning of attenuation of a bearing capacity of a soft soil pile foundation according to claim 1, wherein the pre-training data set and the target data set are obtained as follows: performing a plurality of tests under different working conditions through the loop loading tests in S1, obtaining time series data of attenuation of the horizontal bearing capacities of the pile foundation under the different working conditions, and manufacturing the data into a plurality of data sets, wherein any one data set is the target data set, and the remaining data sets are the pre-training data sets.

6. The meta-learning strategy based method for early warning of attenuation of a bearing capacity of a soft soil pile foundation according to claim 1, wherein the pre-training data set and the target data set are obtained as follows: performing a plurality of tests under different working conditions through the loop loading tests in S1, obtaining time series data of attenuation of the horizontal bearing capacities of the pile foundation under the different working conditions, and manufacturing the data into a plurality of pre-training data sets, wherein monitoring data under actual working conditions are the target data set.

7. The meta-learning strategy based method for early warning of attenuation of a bearing capacity of a soft soil pile foundation according to claim 1, wherein the loop loading test device comprises a model box, a model pile, a loading system and a monitoring system, the loading system comprises a horizontal loop loading system, an acquisition instrument and a first computer, the first computer is configured to set a loading frequency and loop times, control a loading mode and record changes of load and displacement data of a loading position of a pile body, the monitoring system comprises a laser displacement sensor, a dynamic demodulation instrument and a second computer, and the second computer is connected to the dynamic demodulation instrument, so as to record a change of a wavelength of the pile body.

8. The meta-learning strategy based method for early warning of attenuation of a bearing capacity of a soft soil pile foundation according to claim 6, wherein a target pile foundation monitoring system is established under an actual working condition, monitoring data are obtained by the monitoring system, and a target data set of a horizontal bearing capacity of a pile foundation under the actual working condition is obtained.

* * * * *